Jan. 22, 1957
J. E. YOUNG
2,778,472
ACTUATING MECHANISM
Filed Sept. 21, 1951
5 Sheets-Sheet 1
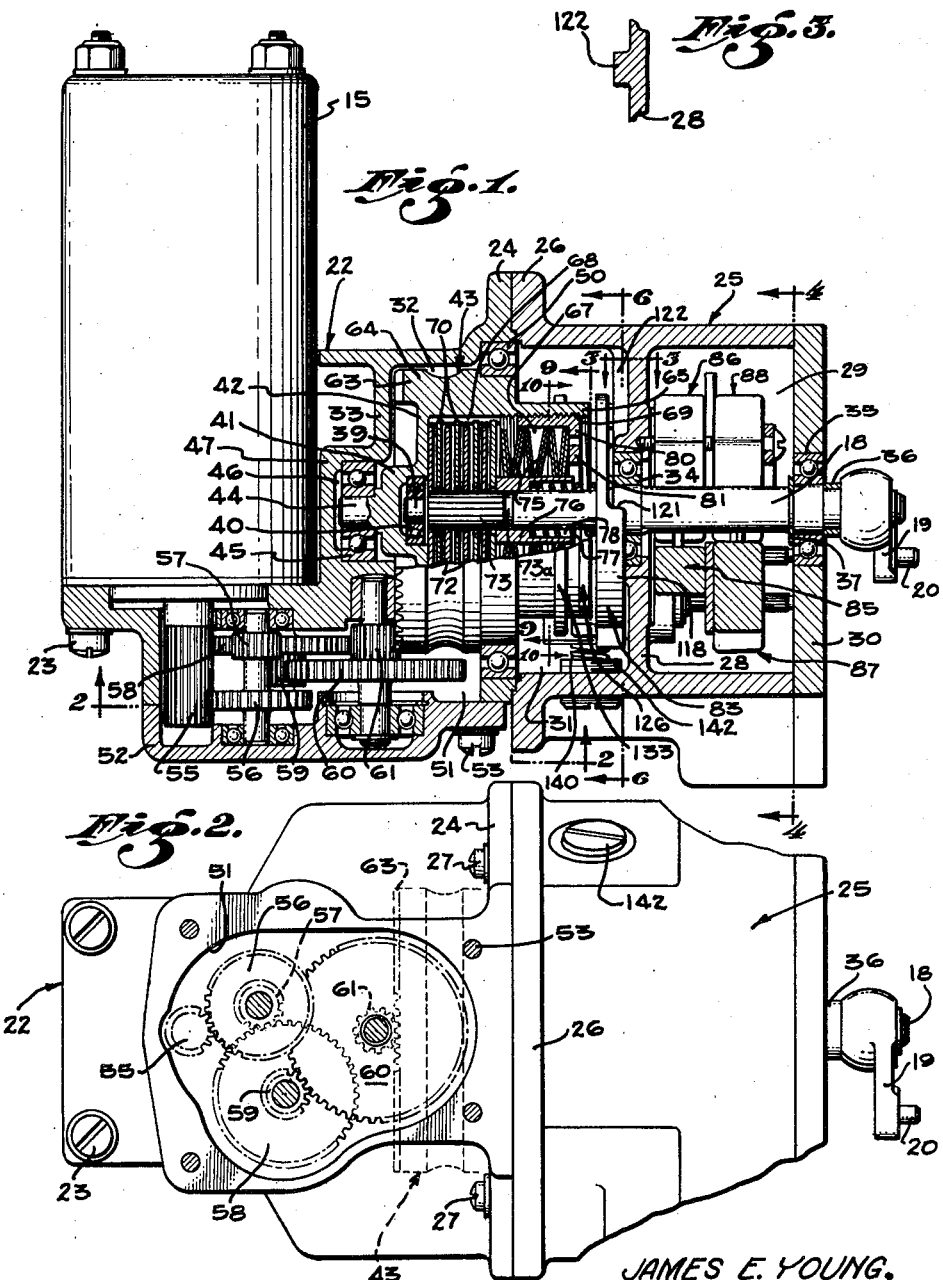
JAMES E. YOUNG,
INVENTOR.
BY
ATTORNEY Jan. 22, 1957 J. E. YOUNG 2,778,472
ACTUATING MECHANISM
Filed Sept. 21, 1951 5 Sheets-Sheet 2
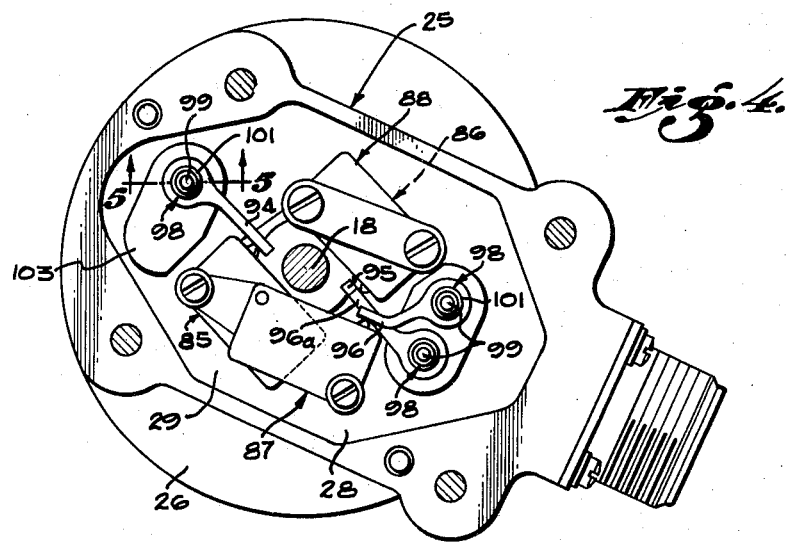
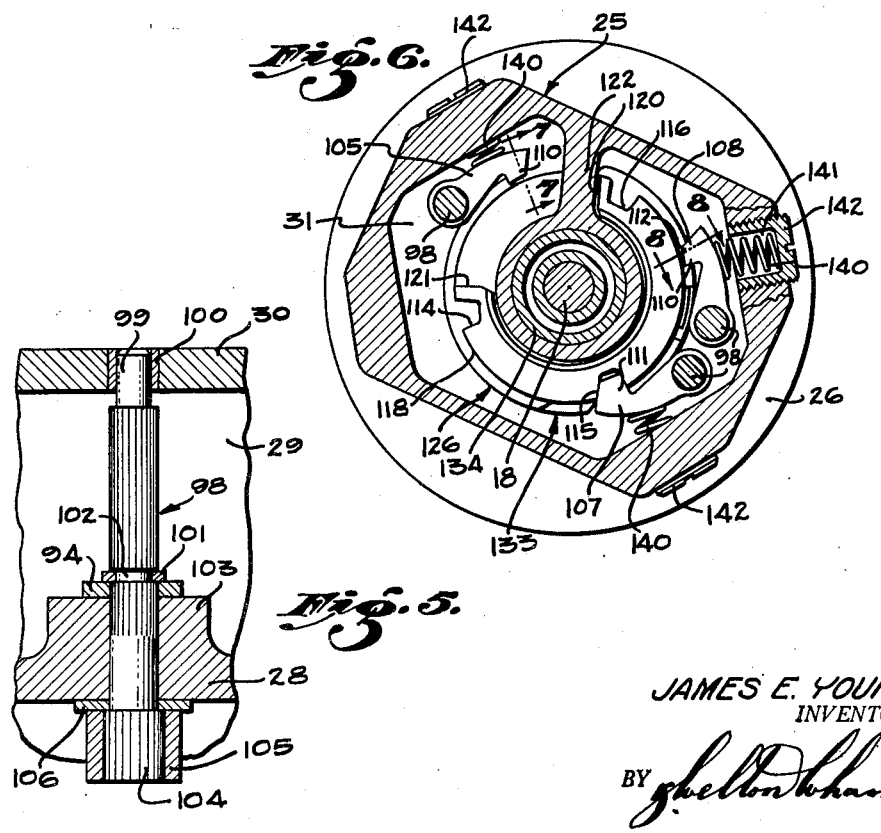
JAMES E. YOUNG,
INVENTOR.
BY *Shelton Shann*
ATTORNEY

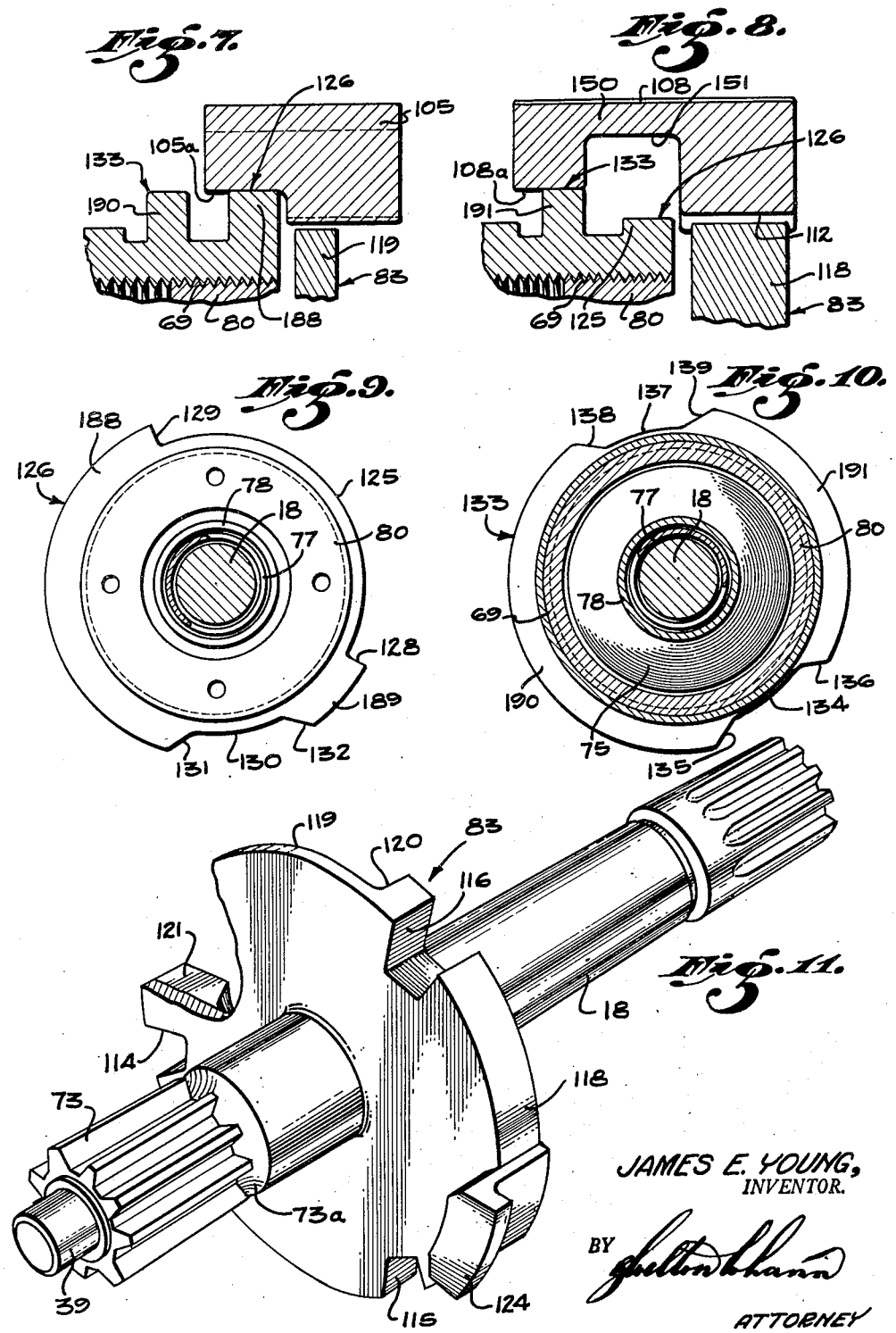

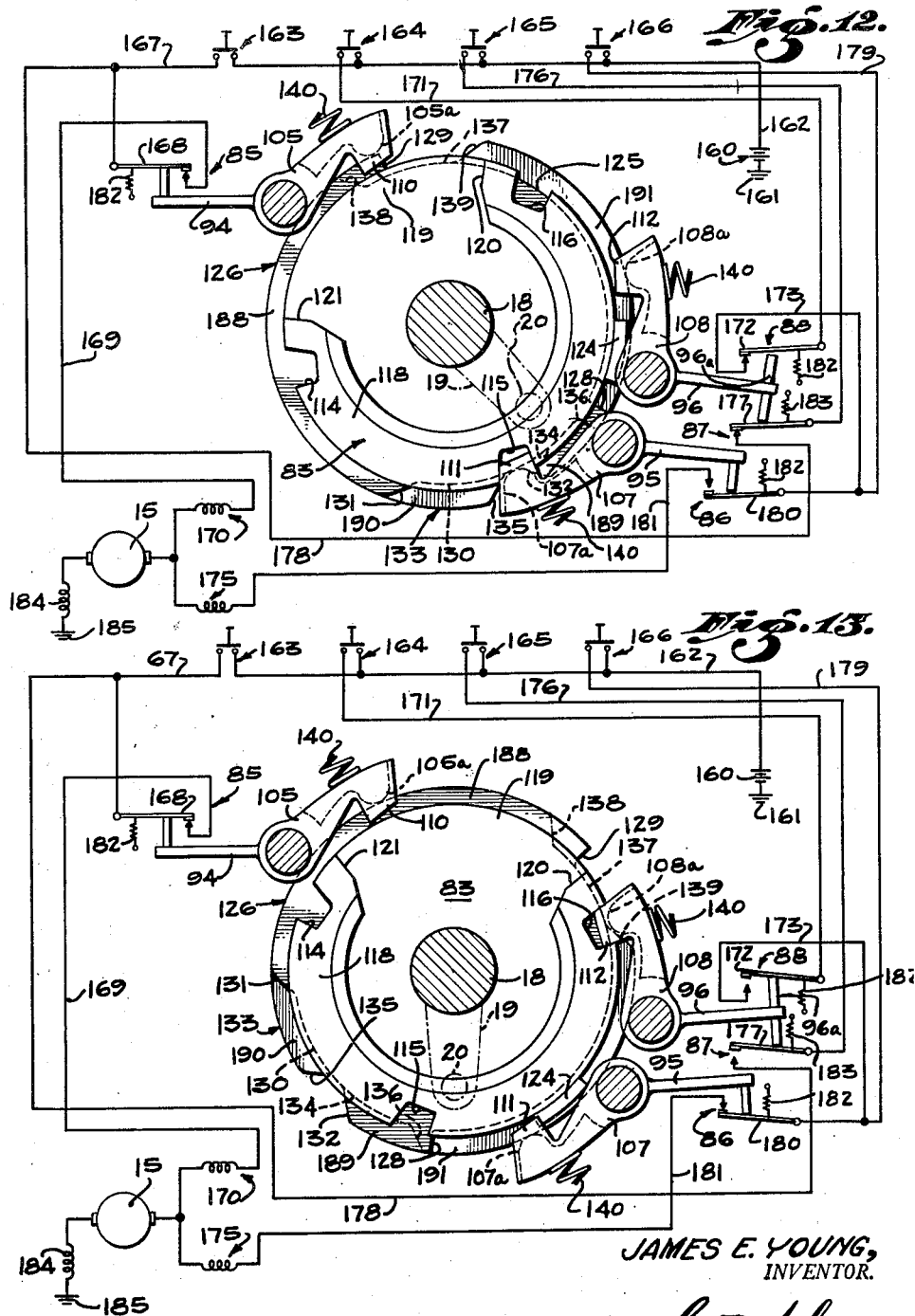

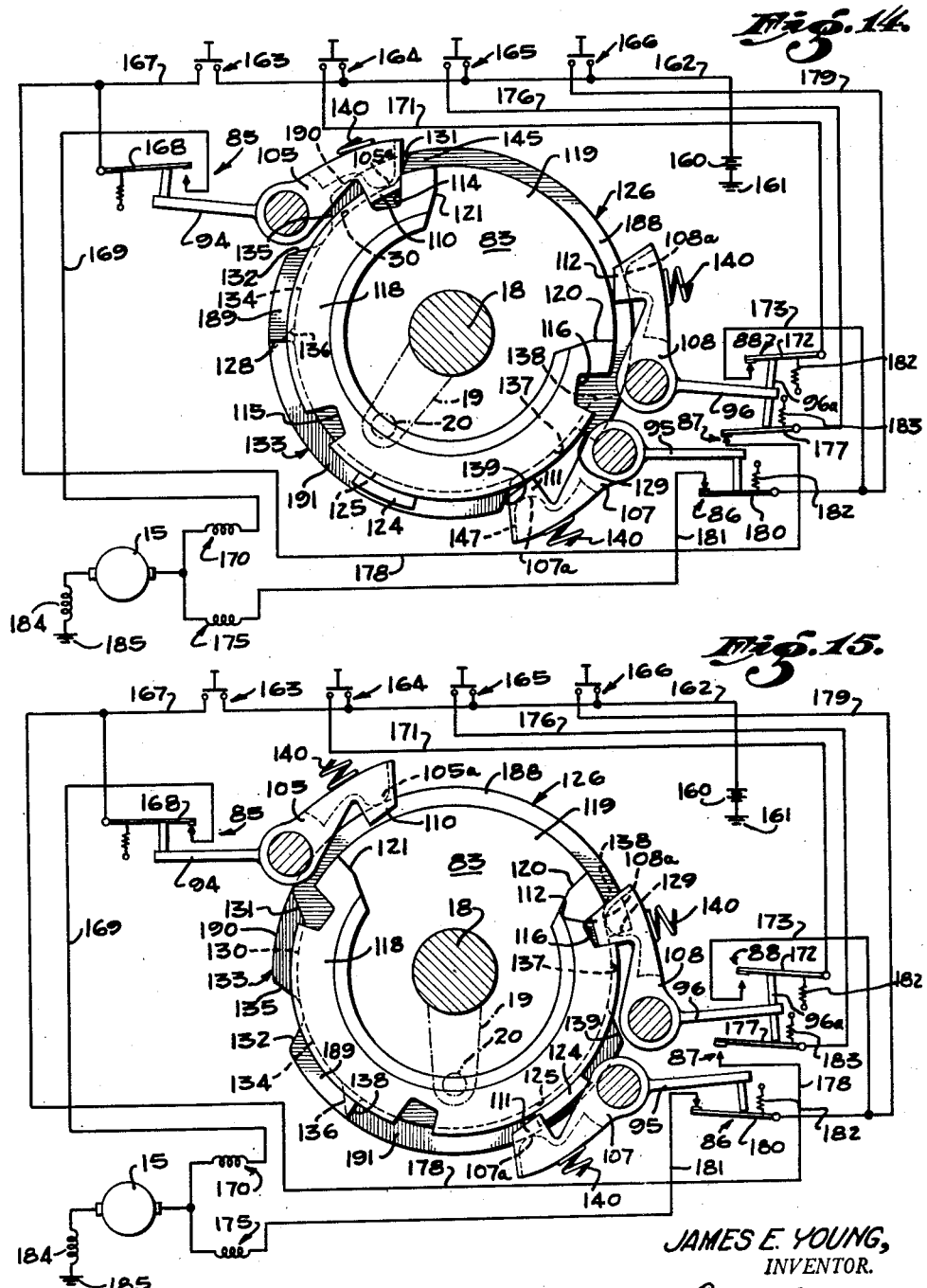

United States Patent Office 2,778,472
Patented Jan. 22, 1957

2,778,472

ACTUATING MECHANISM

James E. Young, Los Angeles, Calif., assignor to The Garrett Corporation, Los Angeles, Calif., a corporation of California Application September 21, 1951, Serial No. 247,689

5 Claims. (Cl. 192—142)

This invention relates generally to actuating mechanisms and relates more particularly to power-operated torque actuators.

The invention has general utility and may be used in a great variety of installations. One use is to control the engagement and disengagement of the main clutch in the drive between a gas turbine engine and a propeller.

In turbo-propeller installations, it is usual to have the propeller disengaged from the engine during starting thereof, and thereafter, when the engine is operating under its own power (and running at approximately 10,000 R. P. M.), the propeller is connected up to the engine. Due to the relatively high speed of the engine and the inertia of the propeller, which may be of the four-bladed type and relatively heavy, the clutch is subjected to particularly severe strains and stresses. In order to prevent damage to the various parts involved, and particularly the clutch when the latter is engaged and the propeller is connected up to the engine, a multiple plate slip clutch is provided and immediately after the clutch is actuated to the plate engaging position, oil is directed on to the plates to reduce friction and to act as a coolant for said plates. After the clutch has stopped slipping, the oil is cut off therefrom. Thus a multiple stage actuator is required.

It is, therefore, an object of the present invention to provide an actuator mechanism which will control the clutch of a turbo-propeller mechanism so as to properly meet the various requirements thereof.

Another object of the invention is to provide an actuator of this character that has multiple stage operation.

It is another object of the invention to provide a device of this character that operates in a plurality of stages starting from either limit of movement.

It is a further object of the invention to provide a device of this character adapted to operate the torque shaft in either direction through its full travel or a predetermined portion thereof.

It is a still further object of the invention to provide a device of this character having a positive lock-out for the various positions at which it is desired to stop the actuating shaft or part.

Another object of the invention is to provide a device of this character wherein overtravel of the actuating part is eliminated even though there may be motor override.

A still further object of the invention is to provide a device of this character wherein vibrational switch action is eliminated.

Another object of the invention is to provide a device of this character wherein even wide temperature change will have little or no effect on the action and stop positions of the device due to the fact that there are no long parts, the length of which would vary adversely with wide temperature changes.

Still another object of the invention is to provide a device of this character that is simple and compact in construction, that is positive, reliable and rugged and that is substantially immune to damage due to vibrations such as it may be subjected to when incorporated in certain installations.

Further objects and advantages of the invention will be brought out in the following part of the specification.

Referring to the drawings, which are for illustrative purposes only:

Fig. 1 is a partial section through a power-operated actuator mechanism embodying the present invention;

Fig. 2 is a view taken on line 2—2 of Fig. 1 showing the gears as they appear with the cover of the gear box removed;

Fig. 3 is a section taken on line 3—3 of Fig. 1;

Fig. 4 is an enlarged view taken on line 4—4 of Fig. 1 showing the interior of the switch box;

Fig. 5 is an enlarged section taken on line 5—5 of Fig. 4;

Fig. 6 is an enlarged section taken on line 6—6 of Fig. 1;

Fig. 7 is an enlarged section taken on line 7—7 of Fig. 6;

Fig. 8 is an enlarged section taken on line 8—8 of Fig. 6;

Fig. 9 is an enlarged section taken on line 9—9 of Fig. 1;

Fig. 10 is an enlarged section taken on line 10—10 of Fig. 1;

Fig. 11 is an enlarged perspective of the output shaft and locking disc with a portion broken away;

Fig. 12 is a diagrammatic view, including the electrical circuits, showing the switch operating lockout mechanism at the full counterclockwise end position;

Fig. 13 is a similar view showing said mechanism at the center position after movement from the position shown in Fig. 12;

Fig. 14 is a similar view showing said mechanism at the full clockwise end position; and Fig. 15 is a similar view showing said mechanism at the center position after operation from the position shown in Fig. 14.

Referring more particularly to Figs. 1 and 2, there is shown an actuator having an electric motor 15 which operates an output shaft 18 having a crank adjacent the outer end, said crank including a crank arm 19 having one end secured on the shaft 18 by any suitable means and a crank pin 20 adjacent the free end of said arm 19. Devices or mechanisms to be actuated are connected to the crank pin 20 by suitable means such as linkage, not shown.

The motor 15 is secured to a gear housing, indicated generally at 22, by suitable means such as screws 23, said gear housing 22 having an outwardly extending flange 24 adjacent the end thereof opposite the motor to which a suitable switch housing, indicated generally at 25, is attached, said switch housing having an outwardly extending annular flange 26 adjacent one end which abuts the outer side of the flange 24, screws 27 disposed in spaced relation securing the flanges together.

The switch housing 25 has a transverse partition 28 normal to the axis of said housing, located intermediately of the ends thereof. Outwardly of the partition 28 is a switch chamber 29 closed at the outer end by a removable cover plate 30 suitably secured to the outer end of the housing 25. On the other side of the partition 28 is a recess 31 which, together with a recess 32 in the gear housing 22, forms a clutch chamber, the bottom or inner end of the recess 32 being defined by a partition 33 in said gear housing 22.

The means for rotatably mounting the output shaft 18 comprises a pair of ball bearing assemblies, 34 and 35, mounted in respective openings in the partition 28 and cover plate 30, a crank arm 19 being secured on the portion of the shaft 18 which extends outwardly of the cover plate 30, said arm being spaced from the bearing 35 by a spacer sleeve 36. On the opposite side of the bearing 35 is a retainer ring 37 received in an annular groove provided therefor in the shaft 18, said shaft being thereby held against longitudinal or axial shifting. The inner end of shaft 18 terminates in a reduced diameter portion 39 received in a ball bearing assembly 40 disposed in a recess provided therefor in a generally cup-shaped portion 41 formed in the end wall 42 of a clutch housing indicated generally at 43. The inner end of the portion 41 terminates in an axial extension 44 received in a suitable ball bearing assembly 45 disposed in a recess 46 defined by a cup-shaped portion or part 47 of the partition 33 in the gear housing.

The clutch housing has a reduced diameter portion for reception of a ball bearing assembly 50 which is mounted in a recess provided therefor in the bearing housing 22 adjacent the flanged end thereof.

The clutch housing is operated by the motor 15 through a speed reduction gear system located in a gear box 51 which comprises part of the housing 22, said gear box having a cover 52 secured to the housing 22 by any suitable means such as screws 53. The gear system includes a gear 55 mounted on the motor shaft and the gear chain includes gears 56, 57, 58, 59 and 61 mounted on various shafts provided therefor, said shafts being mounted in ball bearing assemblies and bushings as best shown in Fig. 1. The gear 61 drives a crown gear 63 formed integrally with a part 64 of the clutch housing located within the recess 32 of the gear housing. The clutch housing also includes a reduced diameter portion 65 which extends axially of the portion 64 and is disposed in the recess 31 of the switch housing 25. Within the clutch housing 43 is a recess opening 67, the inner portion of which is provided with a plurality of axially extending teeth 68 and the outer portion of which is provided with an internal thread, as at 69. There are a plurality of clutch plates disposed within the inner portion of the recess 67, alternate plates 70 being provided with peripheral notches for slidable reception of the teeth 68 so that said plates 70 will be positively driven by the gear housing 43, said plates 70 having central openings of larger diameter than the diameter of the shaft 18 which extends through said openings. Between the plates 70 there are other clutch plates, 72, having serrated or toothed central openings for reception of a toothed or splined portion 73 of the shaft 18. The teeth of the plates 72 and the portion 73 are in mesh so that relative movement is prevented. However, the plates 72 may slide axially of the shaft 18. The plates 72 have a diameter less than the plane of the inner edges of the teeth 68. The clutch discs may be of any suitable type and arrangement. For example, the discs may be alternately plain steel and sintered steel coated with frictional material. Thus there is a frictional drive between the clutch housing 43 and the shaft 18.

The plates 70 and 72 are loaded by spring means shown as a plurality of "Belleville" springs 75 disposed in the outer end portion of the recess 67. The springs 75 are received on a sleeve 76 slidable on the shaft 18 and urged against the adjacent clutch plate by a spring 77 which is received in an enlarged bore 78 of said sleeve. An internally flanged, externally threaded nut 80 is screwed to the outer end portion 65 of the clutch housing and the inwardly extending flange 81 engages the outermost "Belleville" spring so that said "Belleville" springs are compressed and place a predetermined desired pressure on the clutch plates which will normally effect a drive between the clutch housing and the shaft 18 but which will permit slippage under certain operating conditions which will hereinafter be described. The flange 81 has a central opening through which the spring 77 extends so that it will react against an output shaft locking disc, indicated generally at 83, and formed integrally with the output shaft intermediate the ends of said shaft.

With this arrangement the "Belleville" springs 75 urge the clutch plates along the splines 73 as said plates wear, and in order to insure the spring 75 maintaining a constant force on the clutch plates, said springs must be kept in exact alignment relative to the axis of the clutch mechanism. This alignment is maintained by the sleeves 76 which will also slide axially on the shaft 18 as the clutch plates wear. Another function of the sleeve 76 is to prevent the springs 75 from entering the groove 73a which must be cut in the shaft 18 in connection with the cutting of the splines 73 during the manufacture of the shaft 18.

Within the switch chamber 29 are a plurality of microswitches, indicated generally at 85, 86, 87 and 88 respectively (Figs. 1, 4, and 10 to 13). These switches are actuated by levers 94, 95 and 96, lever 94 actuating the switch 85, lever 95 actuating switch 86 and levers 96 and 96a actuating switches 87 and 88 as will be more particularly pointed out hereinafter. The levers 94, 95 and 96 are suitably secured to respective shafts, indicated generally at 98. The shafts 98 are similar in construction and arrangement and one such shaft is shown in detail in Fig. 5. In this figure the shaft is shown as having a reduced end portion 99, mounted for rotated movement in a bushing 100 in the cover plate 30. The switch lever 94 is press fitted on a splined portion of the shaft 98 and is held against axial movement on the shaft by a snap ring 101 disposed in a groove 102 provided therefor at the proper location in shaft 98. The shaft 98 is also journaled in a boss 103 formed integrally with the partition wall 28 of the switch housing 25. Shaft 98 has a portion which extends into the recess 31 and which includes an enlarged portion 104 having ribs or splines on which a dog 105 is pressed, there being a washer 106 between the dog and wall 28. The other shafts 98 also carry dogs located in the recesses 31, there being a dog 107 and 108. Thus the levers 94, 95 and 96 are actuated with movements of the respective dogs 105, 107, and 108.

Each of the dogs 105, 107, 108 have a generally laterally extending end portion 110, 111 and 112 adapted to be received in notches 114, 115 and 116 of the output shaft lock disc 83 as will be hereinafter more particularly pointed out. The locking disc 83 is provided with an axially extending flange 118 which is adjacent the periphery of said disc, said flange having a cutaway or notched portion 119 defined at the ends by abutments 120 and 121 which are adapted to engage a stop member 122 formed as a web which extends into the recess 31 from the partition wall 28, said web being integral with said wall. Rotary movement of the disc 83 is thus positively limited to a predetermined amount which is determined by the length of the notch 119.

The disc 83 is also provided with a positive emergency limit stop 124 which extends axially of the disc 83 and in the opposite direction from the flange 118. The stop 124 is received in a notch 125 in a cam 126 on the portion 65 of the clutch housing, the disc 83 being disposed adjacent the outer end of said portion 65, as best shown in Fig. 1. The stop member 124, under certain conditions, will engage either end wall 128 or 129 of the notch 125 and positively limit movement of the cams when the appropriate stop 120 or 121 of the locking disc 83 is engaged with the stop member 122. The cam 126 also has a notch or cutaway portion 130 having outwardly inclined end walls 131 and 132.

Adjacent to but spaced from the cam 126 is a cam 133 or the portion 65, said cam 133 being on the opposite side of cam 126 with respect to the disc 83. Cam 133 is notched at 134 and said notch 134 is provided with end walls 135 and 136 which are inclined outwardly relative to said notch. Generally diametrically opposite the notch 134 is another notch 137 having outwardly inclined walls 138 and 139.

The dogs 105, 107 and 108 are in substantially the same plane as the disc 83 and the free ends are urged toward said disc by springs 140 having outer end portions received in recesses 141 of retainer nuts 142 screwed into tapped openings provided therefor so that the tension of the springs 141 may be adjusted by means of said nuts 142.

Each of the dogs has a cam follower shown as formed integrally therewith. The cam followers are indicated at 105a, 107a and 108a. The cam follower 105a of the dog 105 rides on the cam 126, the latter being adapted to lift the dog 105 under certain operating conditions. The cam follower 108a of the dog 108 is spaced from said dog as best shown in Fig. 7, there being a web 150 connecting the cam follower 108a with the dog 108 so that there is a recess 151 in which the cam 126 is received, the cam follower 108a riding on the cam 133. The dog 107 is substantially the same as the dog 108 so that a description thereof is believed to be unnecessary, it being noted that the cam follower 107a also rides on the cam 133.

Referring to Figs. 12 to 15 inclusive, which diagrammatically show the electrical system, there is shown a source of power, indicated as a battery 160 having one terminal grounded at 161, the other terminal having a connection 162 which leads to a series of manually operable switches 163, 164, 165 and 166 which are normally open. The switch 163 has a wire 167 which leads to a movable switch member 168 of the microswitch 85. The fixed contact of the switch 85 is connected by a wire 169, with a winding 170 of the motor 15. The switch 164 has a connection 171 with a movable contact 172 of the microswitch 88, the fixed contact of said switch 88 having a connection 173 with a wire 179. The switch 165 has a connection 176 with a movable contact member 177 of the microswitch 87. The other contact member of said switch 87 has a connection 178 with the wire 167. The switch 166 has a connection through the wire 179 with a movable contact member 180 of the microswitch 86, the other contact member of said switch 86 having a connection 181 with the motor winding 175. Microswitches 85, 86 and 88 are normally closed by springs 182 and the microswitch 87, normally urged open by spring 183. The brake coil for the motor 15 is indicated at 184 and said motor has a ground 185.

Referring to Fig. 12, the mechanism is shown with the locking plate and the actuating arm 19 in the counterclockwise end position. It will be noted that the laterally projecting part 111 of the dog 107 is received in the notch 115 of the locking disc 83. When the mechanism is in the Fig. 12 position, the cam follower 105a of the cam 105 is resting on the outer surface of the part 188 of cam 126. The cam follower 107a of cam 107 is in the notch 134 of cam 133, thus permitting the part 111 of the dog 107 to enter the notch 115 of disc 83. The cam follower 108a of dog 108 is resting on the part 191 of cam 133. The dogs 105 and 108 are thus in their raised position with respect to the disc 83. With the mechanism in the position shown in Fig. 12, the microswitches 85, 87 and 88 are closed and the switch 86 is open. Should it be desired to effect actuation of the mechanism in the clockwise direction as shown in Figs. 12 to 15 so that said mechanism will turn in the clockwise direction to the clockwise end position, shown in Fig. 14, the manually operable normally open switch 163 is closed so that the coil 170 of the motor 15 is energized and the motor will operate the shaft 18 and actuating arm 19 to the clockwise end position as shown in Fig. 14, there being a hesitating stop at the intermediate position shown in Fig. 13.

As the motor starts to operate upon closing of the switch 163, the cams 126 and 133 start to turn due to the slippage of the clutch, the plate 83 being held or locked against movement by engagement of the dog 107 with the notch 115. As the cams 126 and 133 turn in the clockwise direction, the cam follower 107a rests on the bottom of the notch 134 of cam 133 until the inclined end 136 of said notch engages the cam follower 107a and raises the portion 111 of the dog 107 out of the notch 115. Thereupon the disc 83 and its integral shaft 18 begin to rotate in the clockwise direction. When the parts approach the position shown in Fig. 13, the cam follower 108a will follow the end wall 139 of the notch 137 of cam 133 so that the laterally extending portion 112 of the dog 108 enters the notch 116 of the disc 83, temporarily locking said disc against further movement, whereupon the clutch will again slip until the end wall 138 of the notch 137 engages the cam follower 108a and raises the dog 108 out of engagement with notch 116 thereby unlocking or releasing the disc 83. Thereafter the cam follower 108 will ride on the part 190 of cam 133. As the parts of the mechanism approach the position shown in Fig. 14 the end wall 131 of notch 130 of cam 126 reaches the cam follower 105a and upon further movement of the mechanism in the clockwise direction, the cam follower 105a will follow end 131 of the notch 130 and the end portion 110 of the dog 105 will enter the notch 114, thereby locking the disc 83 and shaft 18 in the clockwise end position, Fig. 14. As the position 110 of the dog 105 drops into the notch 114, the arm 94 engages the switch member 168 of microswitch 85 thus opening said microswitch and cutting off the power to the motor 15 which thereupon stops and even though there may be some override, the shaft 18 will not move, such override being taken care of my slippage of the clutch, the cam follower 105a moving part way along in the notch 130. Movement of the locking disc, and hence shaft 18, in the clockwise direction beyond a predetermined point, is positively limited by engagement of the end 121 of the flange 118 with the stop 122. As the mechanism approaches the Fig. 14 position, the cam part 191 moves from beneath the cam follower 107a and allows the spring 140 of the dog 107 to move said dog inwardly so that part 111 thereof is in engagement with the peripheral edge of the disc 83, as shown in Fig. 14. It will be noted that during the movement from the counterclockwise end to the clockwise end, the microswitches 87 and 88 will be opened by the arm 96 actuating switch members 177 and 172 of the respective switches 87 and 88, when the dog 108 engages the notch 116 of disc 83 but, inasmuch as the power is supplied through the microswitch 85, the motor will continue to operate until it reaches the clockwise end position of Fig. 14 and is stopped upon opening of said microswitch 85 as hereinabove pointed out.

Assuming again that the mechanism is in the counterclockwise end position, as shown in Fig. 12, and it is desired to cause the mechanism to be operated to the intermediate position shown in Fig. 13, the manually operable normally open switch 165 is closed thereby energizing the coil 170 of the motor 15. The motor starts to operate and actuation of the dog 107 from the locking position is effected as hereinabove described in connection with the clockwise actuation of the mechanism to the clockwise end position. The power reaches the coil 170 through the microswitch 87 which is opened when the dog 108 moves to the locking position shown in Fig. 13, thus stopping the motor 15. Should it be desired to cause the mechanism to further rotate in the clockwise direction to the clockwise end position, the switch 163 is closed to thereby energize the coil 170 of the motor. The motor will thereupon start to operate and rotate the cams through slippage of the clutch even though the locking disc 83 is held against movement by the dog 108. When the inclined end 138 of the notch 137 of cam 133 engages the cam follower 108a, the part 112 of the dog 108 will be disengaged from the notch 116 and the disc 83 and shaft 18 will then be released to rotate in the clockwise direction until the mechanism reaches the position shown in Fig. 14 at which time the part 110 of dog 105 will engage the notch 114 in the disc 83 and simultaneously effect opening of the microswitch 85 so that the motor will stop operating.

Actuation of the mechanism in the counterclockwise direction, starting with the position shown in Fig. 14, is effected by closing of the manually operable normally open switch 166 which will thereupon energize the motor coil 175, the circuit being then through the microswitch 86, said coil 175 causing the motor to operate the mechanism in the counterclockwise direction. Upon starting its operative movement, the motor will cause the cams to rotate in the counterclockwise direction, which cam movement is permitted by reason of the slippage of the clutch. This slippage will continue until the part 131 of cam 126 engages the cam lifter 105a and effects disengagement of the part 110 of dog 105 from the notch 114 of disc 83; whereupon the disc 83 and shaft 18 will commence to rotate in the counterclockwise direction. At this time the dog 108 is in its outward position, the cam follower 108a thereof then riding on the part 188 of cam 133. When the mechanism has rotated to the position shown in Fig. 15, the cam follower 108a will move down the inclined side 138 of the notch 137 of cam 133 so that the end 112 of dog 108 enters the notch 116 and will remain there until the side 139 of notch 137 engages the cam follower 108a and moves the dog 108 out of the locking position. It will be noted that when the dog 108 is in the Fig. 15 position, the microswitches 87 and 88 are open but this opening of said switches has no effect on the operation of the motor due to the fact that the power is supplied to said motor through microswitch 86 which is not opened until the mechanism reaches the counterclockwise end position. Throughout the movement of the mechanism toward the counterclockwise position from the intermediate position, the cam follower 108 rides on the part 191 of cam 133. During the initial movement of the cams from the clockwise end position the part 111 of the dog 107 is riding on the peripheral edge of the disc 83 until the adjacent end 139 of cam 133 engages the cam follower 107a and moves the dog 107 to its outermost position whereat it is maintained until the mechanism reaches the counterclockwise end position shown in Fig. 12 at which time the part 111 of dog 107 drops into notch 115 as the cam follower 107a moves inwardly on the part 136 of cam 133 whereupon the microswitch 86 is opened and the coil 175 of the motor de-energized so that the motor will stop. There may be some override which occurs through slippage of the clutch, the follower 107a then riding on the bottom of the notch 134. The dog 105 is maintained in its outermost position throughout the counterclockwise movement of the plate 83 by the portion 188 of cam 126 upon which the cam follower 105a rides throughout said movement.

Should it be desired to actuate the mechanism from the clockwise end portion, shown in Fig. 14, to the intermediate position, shown in Fig. 15, the manually operable normally open switch 164 is closed to provide power through microswitch 88 for energizing the coil 175 of the motor. The mechanism will function, as hereinabove dscribed, for the movement from the clockwise end until the dog 108 engages the notch 116 at which time the microswitch 88 is opened and due to the fact that the power is supplied through this switch for actuating the mechanism to the intermediate position, the motor coil 175 will be deenergized with opening of switch 88 so that the motor will stop and the disc 83 will be held locked in the intermediate position.

In order to complete the movement of the mechanism to the counterclockwise end position, switch 166 is closed for energizing the coil 175 through the microswitch 86. The mechanism will then operate to the counterclockwise end position shown in Fig. 12 and the motor will stop operating when the dog 107 engages the notch 115 and microswitch 86 is opened.

From the foregoing, it will be apparent that the mechanism is movable from any of its various positions to any other position by the proper actuation of the various switches 163, 164, 165 and 166.

As an example of one use of the above described actuating mechanism, let it be assumed that said mechanism is connected to the clutch of a drive between a gas turbine engine and a propeller to be driven thereby. The actuator would operate from one end position whereat the clutch would be disengaged. Let it be assumed that the end position referred to is the counterclockwise end position shown in Fig. 12. When the engine has been started and brought up to the desired speed, switch 163 is closed and the mechanism will operate to the clockwise end position, the crank arm 19 moving from the position shown in Fig. 12 to that shown in Fig. 14. As the mechanism moves from the counterclockwise end position to the clockwise end position, the clutch of the drive between the engine and propeller is first engaged and upon further rotation of the crank arm, a supply of oil is turned on to cool the clutch plates of the engine drive and serve as a lubricant for said plates. As soon as the slippage of the clutch of the engine drive ceases, the switch 164 is closed to cause the mechanism to operate in the reverse direction until the intermediate position, shown in Fig. 15, is reached.

At this point, the oil supply to the clutch of the engine drive is cut off inasmuch as there is no further need for either lubricant or coolant in the clutch until another start is made. The clutch of the engine drive will be disengaged by closing the switch 166 which effects movement of the mechanism to the counterclockwise end position. Inasmuch as the mechanism will operate from any position to any other position various types of installations may be made.

I claim:

1. In a multi-stage actuating mechanism: an output actuating member; power means for operating said actuating member; a slippable driving connection between said power means and said actuating member including a housing driven by said power means; releasable means for positively locking the output actuating member in various predetermined positions; selective control means for the locking means for locking said actuating member in any of the various positions; means controlled by the locking means for stopping operation of the power means when said locking means locks the actuating member in a selected position; cams carried by said housing so as to be operated by the power means for releasing the locking means; means limiting movement in both directions of said actuating member; and means limiting movement of the actuating member and cams relative to each other.

2. In a multi-stage actuating mechanism: an output actuating means, including a rotatable shaft; power means for operating said actuating means, including a driving member aligned with said shaft; a slippable driving connection between said power means and said actuating means, including a housing driven by said power means; releasable means for positively locking the output actuating means in various predetermined positions; selective control means for the locking means for locking said actuating means in any of the various positions; means controlled by the locking means for stopping operation of the power means when said locking means locks the actuating means in a selected position; cams carried by said housing so as to be operated by the power means for releasing the locking means; and means limiting movement in both directions of said actuating means.

3. In a multi-stage actuating mechanism: an output actuating member; power means for operating said actuating member; a slippable driving connection between said power means and said actuating member including a housing driven by said power means; releasable means for positively locking the output actuating member in various predetermined positions; selective control means for the locking means for locking said actuating member in any of the various positions; means controlled by the locking means for stopping operation of the power means when said locking means locks the actuating member in a selected position; and cams carried by said housing so as to be operated by the power means for releasing the locking means.

4. In a multiple stage actuating mechanism: actuating means comprising a rotatable output shaft having a part to which mechanism to be operated may be connected; a locking disc on said shaft, said dics having three annularly spaced peripheral notches therein; power means comprising a reversible electric motor; a driving connection between the motor and shaft, said driving connection comprising a clutch having a clutch housing substantially concentric with the output shaft and having one end disposed adjacent the locking disc but in spaced relation thereto; a plurality of clutch plates operably disposed in the clutch housing for providing a friction drive between said clutch housing and the shaft; means placing the clutch plates under a predetermined load so that said plates will provide a drive connection between the clutch housing and shaft under normal operating conditions but will slip under predetermined resistance to rotation of said shaft; said driving connection also including a speed reduction means interposed between the motor and clutch housing; a pair of cams integral with the clutch housing and located externally thereof adjacent the end disposed adjacent the locking disc, said cams being spaced axially from each other; three pivoted dogs spaced annularly about the locking disc adjacent the periphery thereof, each dog being provided with a part movable into the notches of the locking disc for positively locking said disc in predetermined position; means urging the dogs toward locking position with respect to said notches, a cam follower for each of the dogs, one of said cam followers being operably associated with the nearest cam and the other cam followers being operable associated with the other cams; stop means spaced peripherally apart upon the locking disc; a fixed stop member with which the stop means on the locking disc are adapted to engage to limit rotary movement of said disc in both directions while permitting limited operative movement thereof; a stop on the locking disc extending into a notch in the adjacent cam, said stop being engageable with either end wall of said notch to thereby limit rotation of the clutch housing when a corresponding stop means on the locking disc engages the stop member; control means comprising an electrical system for the motor and including a source of power and four circuits between said source of power and motor; a normally open manually operable switch for each circuit; and a microswitch for each circuit, two of said dogs being connected with two of the microswitches respectively for effecting actuation thereof, the other two switches being controlled by the other dog; the circuits on the switches being so arranged that closing of one of the manually operable switches will effect operation of the mechanism from one end position to the other at which time a dog will engage one of the notches in the locking disc and simultaneously open the circuit energized by closing of said one manually operable switch, closing of another manually operable switch will effect actuation of said mechanism from the said other end position to the first mentioned end position at which time another dog will engage a notch in the locking disc and simultaneously shut off the source of power from the motor, the other two manually operable switches being adapted to control actuation of the mechanism from the respective ends to an intermediate position whereat the third dog will engage a notch in the locking disc and simultaneously effect cutting off the current to the motor.

5. In a multi-stage actuating mechanism: an output actuating member; power means for operating said actuating member; a slippable driving connection between said power means and said actuating member, including a housing driven by said power means; releasable means for positively locking the output actuating member in various predetermined positions; selective control means for the locking means for locking said actuating member in any of the various positions; means controlled by the locking means for stopping operation of the power means when said locking means locks the actuating member in a selected position; cams carried by said housing so as to be operated by the power means for releasing the locking means; and means limiting movement of the actuating member and cams relative to each other.

References Cited in the file of this patent

UNITED STATES PATENTS

| 2,360,488 | Garman | Oct. 17, 1944 |
| 2,481,832 | Floraday | Sept. 13, 1949 |
| 2,493,622 | Eskuchen | Jan. 3, 1950 |
| 2,526,152 | Paessler | Oct. 17, 1950 |
| 2,546,980 | Collins | Apr. 3, 1951 |
| 2,574,603 | Uhlig | Nov. 13, 1951 |
| 2,591,413 | Elliott | Apr. 1, 1952 |
| 2,603,330 | Isaacs | July 15, 1952 |
| 2,604,965 | Schweighofer et al. | July 29, 1952 |

FOREIGN PATENTS

| 602,721 | France | Dec. 30, 1925 |